United States Patent
Robert Jose et al.

(10) Patent No.: US 11,961,507 B2
(45) Date of Patent: *Apr. 16, 2024

(54) SYSTEMS AND METHODS FOR IMPROVING CONTENT DISCOVERY IN RESPONSE TO A VOICE QUERY USING A RECOGNITION RATE WHICH DEPENDS ON DETECTED TRIGGER TERMS

(71) Applicant: Rovi Guides, Inc., San Jose, CA (US)

(72) Inventors: Jeffry Copps Robert Jose, Tamil Nadu (IN); Sindhuja Chonat Sri, Tamil Nadu (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/116,501

(22) Filed: Mar. 2, 2023

(65) Prior Publication Data

US 2023/0206904 A1    Jun. 29, 2023

Related U.S. Application Data

(63) Continuation of application No. 16/889,036, filed on Jun. 1, 2020, now Pat. No. 11,620,982.

(51) Int. Cl.
| | |
|---|---|
| *G10L 15/02* | (2006.01) |
| *G06F 16/432* | (2019.01) |
| *G06F 16/438* | (2019.01) |
| *G06F 40/279* | (2020.01) |
| *G10L 15/14* | (2006.01) |
| *G10L 15/26* | (2006.01) |
| *H04M 3/51* | (2006.01) |

(52) U.S. Cl.
CPC ............ *G10L 15/02* (2013.01); *G06F 16/433* (2019.01); *G06F 16/438* (2019.01); *G06F 40/279* (2020.01); *G10L 15/26* (2013.01); *G10L 15/14* (2013.01); *H04M 3/5116* (2013.01)

(58) Field of Classification Search
CPC .. G06F 16/3326; G06F 16/433; G06F 40/279; G10L 15/02; G10L 15/26
USPC ............................................. 704/235; 379/45
See application file for complete search history.

(56) References Cited

U.S. PATENT DOCUMENTS

| | | | |
|---|---|---|---|
| 11,620,982 B2* | 4/2023 | Robert Jose | G06F 16/3326 704/235 |
| 2010/0070277 A1 | 3/2010 | Arakawa et al. | |
| 2016/0063994 A1 | 3/2016 | Skobeltsyn et al. | |
| 2016/0203817 A1 | 7/2016 | Formhals et al. | |

(Continued)

*Primary Examiner* — Farzad Kazeminezhad
(74) *Attorney, Agent, or Firm* — Haley Guiliano LLP

(57) ABSTRACT

A transcription of a query for content discovery is generated, and a context of the query is identified, as well as a first plurality of candidate entities to which the query refers. A search is performed based on the context of the query and the first plurality of candidate entities, and results are generated for output. A transcription of a second voice query is then generated, and it is determined whether the second transcription includes a trigger term indicating a corrective query. If so, the context of the first query is retrieved. A second term of the second query similar to a term of the first query is identified, and a second plurality of candidate entities to which the second term refers is determined. A second search is performed based on the second plurality of candidates and the context, and new search results are generated for output.

20 Claims, 6 Drawing Sheets

(56) References Cited

U.S. PATENT DOCUMENTS

2018/0012594 A1  1/2018  Behzadi et al.
2021/0375263 A1  12/2021  Robert Jose et al.

* cited by examiner

100
Play "Star Wars"

102
Results for Star Horse:

Star Horse – Slower Now (Official Video)
Star Horse – Stranger
Star Horse – Albatross
Star Horse – Pickle Plum (Official Video)

104
"Star Wars," please!

106
"Star Wars" movies:

Star Wars: Episode I: The Phantom Menace
Star Wars: Episode II: Attack of the Clones
Star Wars: Episode III: Revenge of the Sith
Star Wars: Episode IV: A New Hope
Star Wars: Episode V: The Empire Strikes Back
Star Wars: Episode VI: Return of the Jedi
Star Wars: Episode VII: The Force Awakens
Star Wars: Episode VIII: The Last Jedi
Star Wars: Episode IX: The Rise of Skywalker
Rogue One: A Star Wars Story
Solo: A Star Wars Story

FIG. 1

SYSTEMS AND METHODS FOR IMPROVING CONTENT DISCOVERY IN RESPONSE TO A VOICE QUERY USING A RECOGNITION RATE WHICH DEPENDS ON DETECTED TRIGGER TERMS

CROSS-REFERENCE TO RELATED APPLICATIONS

This application is a continuation of U.S. patent application Ser. No. 16/889,036, filed Jun. 1, 2020, the disclosure of which is hereby incorporated by reference herein in its entirety.

BACKGROUND

This present disclosure relates to processing of voice queries and, more particularly, improving content discovery in response to a voice query.

SUMMARY

Voice search systems process natural language queries to identify commands and related parameters spoken by users. Traditional systems identify words or terms within a search query and attempt to execute a command, such as performing a search, based on recognized words. If no command words are recognized, traditional systems may respond with an error or with a notification to the user that the query was not recognized. If words of the query were recognized incorrectly, traditional systems require that the user speak a new query, including the command term and any related parameters in an attempt to cause the system to execute the desired command.

Systems and methods are described herein for improving voice search systems to allow a user to speak a corrective query after obtaining an undesired result from a first query. A transcription of the first voice query is generated using, for example, a transcription model, and a context of the first voice query is identified, as well as a first plurality of candidate entities to which the first voice query refers. A first search is performed based on the context of the first voice query and the first plurality of candidate entities, and at least one search result is generated for output. A transcription of a second voice query is then generated, and it is determined whether the second transcription includes a trigger term indicating that the second query is a corrective query. If so, the context of the first query is retrieved. A second term of the second query that is similar to a term of the first query is then identified, and a second plurality of candidate entities to which the second term refers is determined. A second search is performed based on the second plurality of candidates and the context, and at least one search result is generated for output.

The first query may include a first term that is determined by an entity recognition model to refer to a first entity. The second query may include, in addition to the trigger term, a second term that is phonetically similar to the first term. If so, the entity recognition model is modified so that a different or larger set of entities are considered as candidate entities to which the second term refers than the set of entities considered as candidate entities to which the first term referred. For example, a relaxation rate of the entity recognition model may be temporarily increased. The relaxation rate controls the number of candidates considered, either directly or by increasing the number of variants of a given term used to identify candidate entities. A set of candidate entities can be narrowed down using the context of the first query, or using a context determined from any number of prior queries received within a threshold amount of time.

For example, a first query "Play 'Star Wars' is spoken by a user, but is transcribed as "Play 'Star Horse'." The word "play" is recognized as a command to access and play back media content. The term "Star Horse" is searched and results for music and music videos published by the band Star Horse are generated for output. Being dissatisfied with the search results, the user speaks 'Star Wars', please" as a second query. The transcription model used to recognize the words of the query may still transcribe "Star Wars" as "Star Horse," but the trigger term "please" causes an entity recognition module to be relaxed for the term "Star Horse," and other, phonetically similar alternatives are considered. The entity recognition module identifies "Star Wars" as a close phonetic neighbor and, in conjunction with the "play" command from the first query, searches for movies having "Star Wars" in the title.

In the above example, the trigger term is a politeness word (i.e., "please"). However, the trigger term can be any word or phrase that indicates dissatisfaction with the results of the previous query, such as a negative term (e.g., "no"), a corrective phrase (e.g., "I meant"), or any combination thereof.

The context of the first query may be identified based on a keyword in the transcription of the first query, where the keyword is associated with a type of content. Continuing with the above example, the word "play" in the query "Play 'Star Wars'" is a keyword or command word that is associated with media content. As another example, the phrase "show me" may be a keyword or command associated specifically with video content. A phrase such as "what is" or other questions may be keywords associated with information requests.

In some embodiments, after determining that the second query is a corrective query, an indication that the first transcription was incorrect is stored. The transcription model used to generate the transcriptions of the first and second queries may then be refined based on the indication. Additional information, such as the transcriptions of the first and second queries, audio data of the first and second queries, and/or results generated from the first and second queries may be stored as well and used to determine how to refine the transcription model. For example, audio data can be used to adjust the transcription of certain vowel sounds to better accommodate a user's accent.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows exemplary queries and corresponding results generated for output, in accordance with some embodiments of the disclosure;

DETAILED DESCRIPTION

FIG. 1 shows exemplary queries and corresponding results generated for output, in accordance with some embodiments of the disclosure. A first query 100 "Play 'Star Wars'" is received from a user. Query 100 may be incorrectly transcribed or otherwise understood as "Play 'Star Horse'." The word "play" is recognized as a command to retrieve and/or output media content. An entity recognition module therefore searches for entities matching the term "Star Horse" and generates a search query for content related to the matching entity. This causes the system to search for and display results matching audio or video content related to the band Star Horse. Search results 102 are then generated for output to the user visually on a screen such as a smartphone or tablet and/or audibly using a speaker such as on a smart speaker device (e.g., Amazon® Echo®, Google® Home®, etc.). Being dissatisfied with search results 102, the user may enter query 104 "'Star Wars' please!" in an attempt to correct the search. While the term "Star Wars" may continue to be incorrectly transcribed as "Star Horse," the politeness term "please" is recognized as a trigger term indicating that the user wishes to correct or was otherwise dissatisfied with the results of the previous query. For example, each term of query 100 may be compared with a set of known trigger words, such as a database or other listing comprising politeness terms, negative terms, and corrective terms. In response to the trigger term, the entity recognition module searches for other entities that may have a similar name or phonetic sound to "Star Horse" and correctly determines that the entity for which the user intended to search is "Star Wars." Using the context of the previous query (i.e., the "play" command to retrieve/output media content), a search query is generated for content matching the term "Star Wars." Search results 106 are then generated for output to the user, visually and/or audibly as described above.

Figure 2:
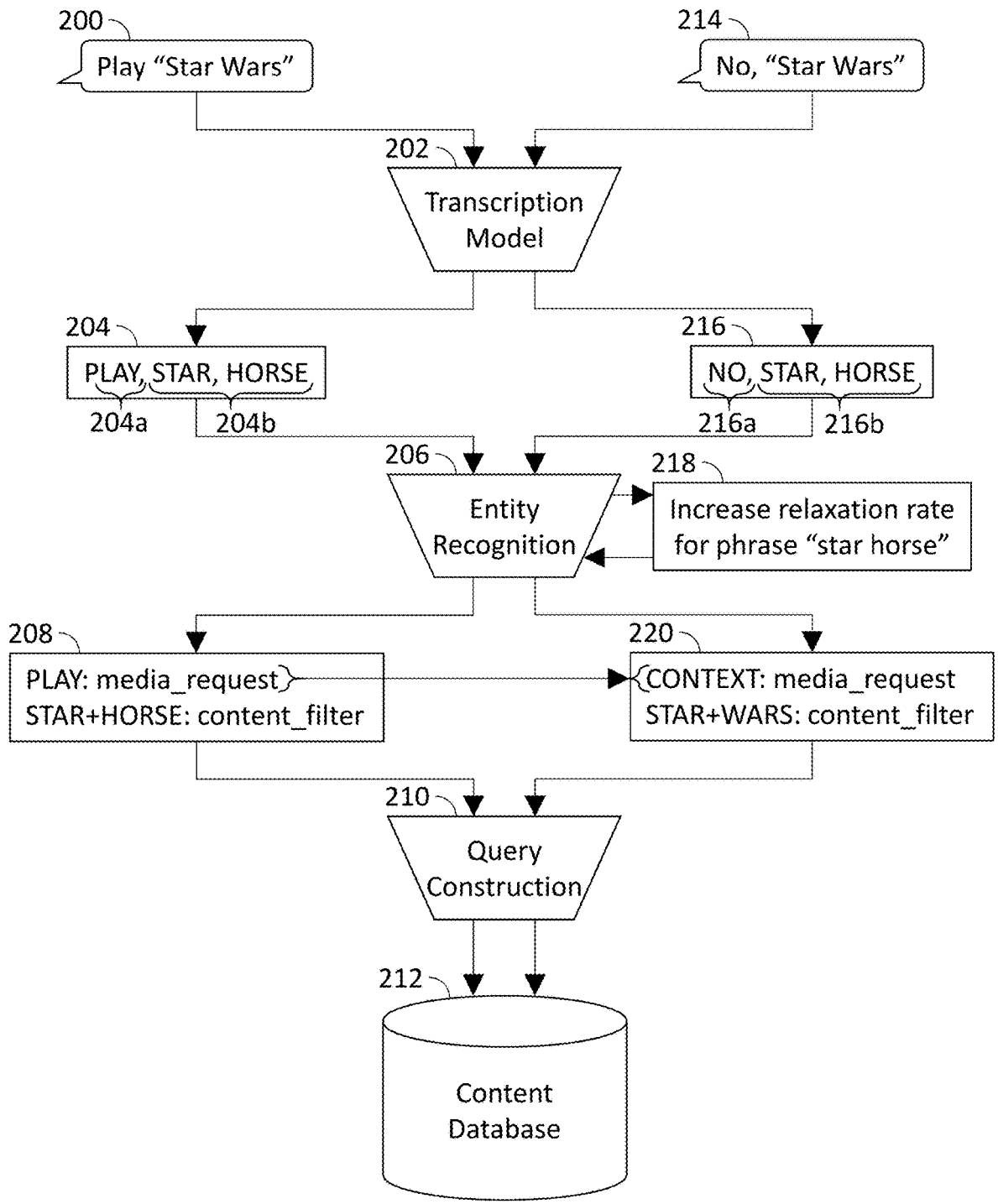
FIG. 2 is a block diagram showing processing of exemplary first and second queries, in accordance with some embodiments of the disclosure.

FIG. 2 is a block diagram showing processing of exemplary first and second queries, in accordance with some embodiments of the disclosure. Voice query 200 "Play 'Star Wars'" is received and processed using transcription model 200, which transcribes voice query 200 into corresponding text. Query 200 is transcribed as text 204 which includes three words "PLAY," "STAR," and "HORSE." Entity recognition module 206 processes terms 204a and 204b. "PLAY" 204a is recognized as a command to access media content. The system infers from this that the remaining words "STAR" and "HORSE" together identify the desired content, and thus recognizes them as a single term 204b. Entity recognition module 206 determines whether term 204b matches any known entities for which content is available. Entity recognition module 206 may, for example, access a database or other listing of content creators, content titles, or other metadata describing available content items and search for content items having data matching term 204b "STAR HORSE." The result is a set of data 208 matching each term of query 200 (i.e., terms 204a and 204b) with corresponding portions of a content query. For example, "PLAY" is recognized as being a media request, and is tagged as such, while "STAR HORSE" is recognized as a content filter to be used as a search parameter. Data 208 is then fed into query construction module 210, which generates a database query, such as an SQL "SELECT" statement, to retrieve content items from content database 212, listings for which are then generated for output to the user.

If the user is dissatisfied with the results, the user may enter voice query 214 "No, 'Star Wars'" in an attempt to correct the results of the previous query. Query 214 is again processed using transcription model 202 to generate text 216. Query 214 is again transcribed into three words "NO," "STAR," and "HORSE." The term "NO" 216a is identified by entity recognition module 206 as a trigger term for a corrective query, and again infers that "STAR" and "HORSE" together form a single term 216b. In response to the trigger term, entity recognition module 206 increases a relaxation rate 218 for the term "STAR HORSE." For example, the entity recognition module may consider entities that are phonetically similar or may search for additional types of content. By increasing the relaxation rate, entity recognition module 206 correctly identifies "Star Wars" as the content to which query 214 refers. Since neither term 216a nor term 216b provides a context for the query, entity recognition module 206 retrieves the context of the previous query 200. The result is a set of data 220 that combines the context of query 200 (i.e., a media request based on the "PLAY" command) with the content filter "STAR WARS" from query 214. Data 220 is then fed into query construction module 210, which generates a database query, such as an SQL "SELECT" statement, to retrieve content items from content database 212, listings for which are then generated for output to the user.

Figure 3:
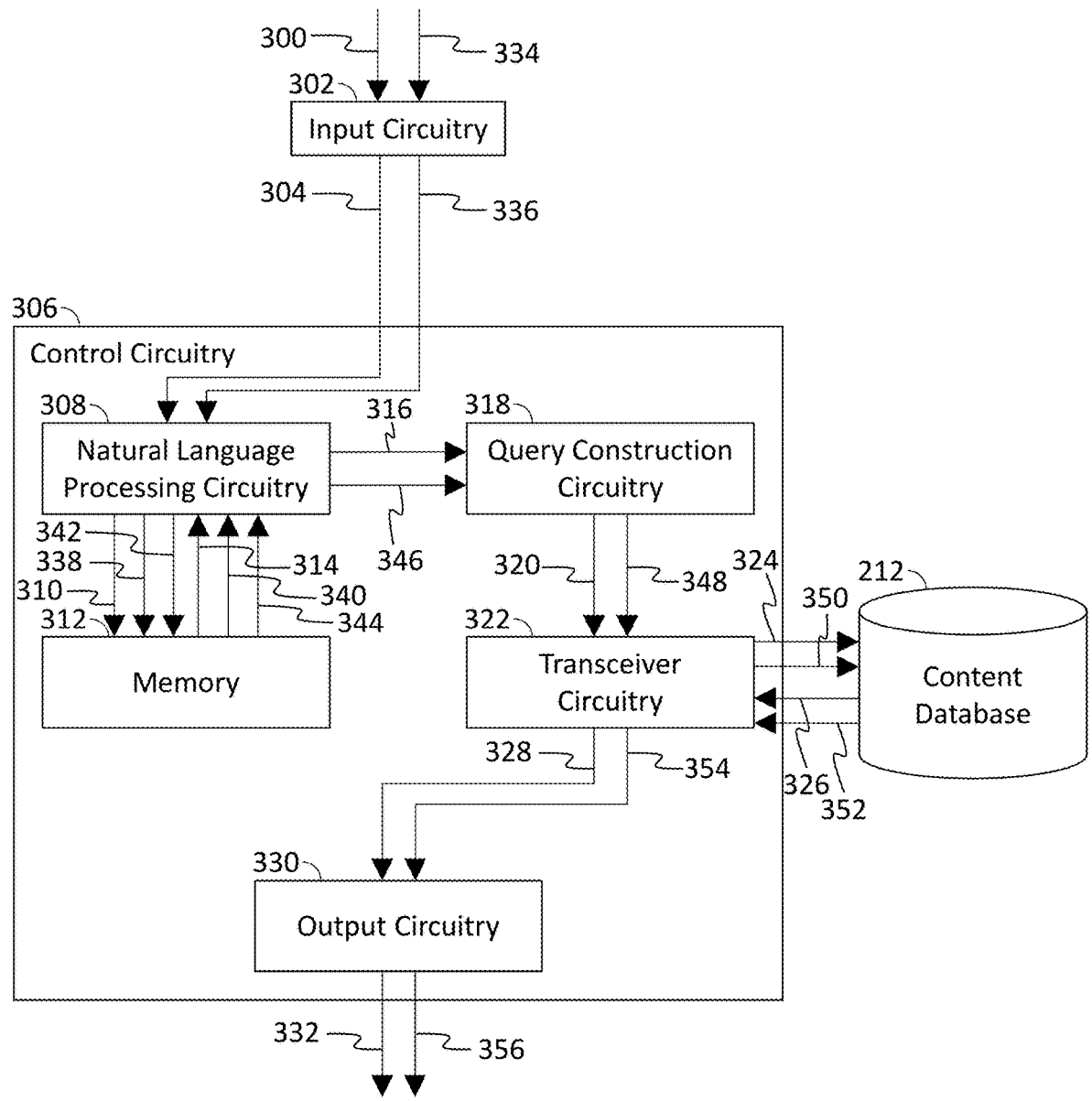
FIG. 3 is a block diagram showing components and data flow therebetween of a system for improving content discovery in response to a voice query, in accordance with some embodiments of the disclosure.

FIG. 3 is a block diagram showing components and data flow therebetween of a system for improving content discovery in response to a voice query, in accordance with some embodiments of the disclosure.

A first voice query is received 300 at input circuitry 302. Input circuitry 302 may be part of a media device on which the system of the present disclosure is implemented, or may be a separate device, such as an Amazon Echo® or Google Home® device, or any other device capable of receiving and relaying user input to a media device. Input circuitry 302 may be a data interface such as a Bluetooth module, WiFi module, or other suitable data interface through which data entered on another device or audio data captured by another device can be received. Alternatively, input circuitry 302 may include a microphone through which audio information is captured directly. Input circuitry 302 may convert the audio to a digital format such as WAV. Input circuitry 302 communicates 304 the voice query to control circuitry 306. Control circuitry 306 may be based on one or more microprocessors, microcontrollers, digital signal processors, programmable logic devices, field-programmable gate arrays (FPGAs), application specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 306 receives and processes the voice query using natural language processing circuitry 308. In some embodiments, control circuitry 306 or natural language processing circuitry 308 may include the transcription circuitry/programming to transcribe audio data of the voice query into a corresponding string of text. Natural language processing circuitry 308 identifies a plurality of terms in the voice query. For example, natural language processing circuitry 308 may identify individual words in the voice query using spaces in a transcription or pauses or periods of silence in the voice query. Natural language processing circuitry 308 analyzes a first word and determines whether the first word can be part of a larger phrase. For example, natural language processing circuitry 308 may access a dictionary or other word list or phrase list from memory 312. Memory 312 may be an electronic storage device such as random-access memory, read-only memory, hard drives, optical drives, solid state devices, quantum storage devices, or any other suitable fixed or removable storage devices, and/or any suitable combination of the same.

Using the dictionary or word list or phrase list, natural language processing circuitry 308 determines if the first word can be followed by at least a second word. If so, natural language processing circuitry 308 analyzes the first word together with the word immediately following the first word to determine if the two words together form a phrase. If so, the phrase is identified as a single term in the voice query. Otherwise, the first word alone is identified as a single term in the voice query.

Natural language processing circuitry 308 determines whether any of the identified terms corresponds to a command. For example, the word "play" or the phrase "show me" may be recognized as a command to access media content for playback. Natural language processing circuitry 308 then determines that the term or terms that follow the command correspond to a type of content or a specific content item to which the voice query refers. Natural language processing circuitry 308, using an entity recognition module such as entity recognition module 206, identifies the specific entity to which the voice query refers. The entity recognition module of natural language processing circuitry 308 requests 310 a list of entities matching the appropriate term of the voice query from memory 312. The entity recognition module receives 314 at least one matching entity and selects a candidate entity based on the context of the voice query. For example, if the command given in the voice query relates specifically to audio content (e.g., music, or audiobooks), the entity recognition module may select a candidate entity corresponding to a musical group or an author.

Once a candidate entity has been selected, natural language processing circuitry 308 transmits 316 the context of the voice query and the selected candidate entity to query construction circuitry 318. Natural language processing circuitry 308 also stores data describing the voice query, including the context and the selected candidate entity in, for example, memory 312. Query construction circuitry 318 then constructs a search query corresponding to context and candidate entity. For example, if the context is media content and the candidate entity is Star Horse, query construction circuitry 318 constructs a query for content created by or including the band Star Horse. For example, query construction circuitry 318 may generate an SQL "SELECT" statement such as "SELECT * FROM video content WHERE creator CONTAINS 'STAR HORSE'." Query construction circuitry 318 transmits 320 the constructed search query to transceiver circuitry 322, which transmits 324 the search query to, for example, content database 212. Transceiver circuitry 322 may be a network connection such as an Ethernet port, WiFi module, or any other data connection suitable for communicating with a remote server. Transceiver circuitry 322 then receives 326 search results from content database 212, which may include content identifiers for a plurality of content items matching the search criteria. Transceiver circuitry 322 transmits 328 the search results to output circuitry 330. Output circuitry 330 may be any video or graphics processing circuitry suitable for generating an image for display on a display device associated with control circuitry 306, and/or any audio processing circuitry suitable for generating an audio signal for output using a speaker or other audio device associated with control circuitry 306. Output circuitry 330 then outputs 332 the content identifiers.

A second voice query is the received 334 using input circuitry 302. The second voice query is processed by input circuitry 302 just as the first voice query was processed and transmitted 336 to control circuitry 306. The second voice query is then transcribed using natural language processing circuitry 308, and terms of the second voice query are identified. If the second voice query contains a trigger term, such as a politeness term (e.g., "please"), negative term (e.g., "no") or corrective term (e.g., "I meant"), then natural language processing circuitry 308 determines that the second voice query is a corrective query, and that the results of the previous query were not the correct results. Natural language processing circuitry 308 requests 338 the stored data describing the previous query from memory 312. Natural language processing circuitry 308 receives 340 the stored data and identifies the context of the previous voice query as the context of the second voice query. Natural language processing circuitry 308 also determines a similarity between the remaining terms of the second voice query and those of the previous voice query as described by the stored data. If the terms are similar (e.g., at least a threshold percentage of the words of a given term are the same, are spelled similarly, or are phonetically similar), then natural language processing circuitry 308 increases a relaxation rate of the entity recognition module. The relaxation rate controls the number of candidate entities considered by the entity recognition module. The relaxation rate is normally low to conserve system resources by limiting the number of variants of a term searched by the entity recognition module. However, for a corrective search to be able to retrieve the correct search results, the relaxation rate is increased to allow the entity recognition module to consider additional variants of the terms of the query. The entity recognition module requests 342 an expanded list of entities matching the appropriate term of the second voice query in accordance with the relaxation rate. The entity recognition module receives 344 the expanded list and selects a candidate entity different from that which was selected for the previous voice query. Natural language processing circuitry 308 then transmits 346 the context of the voice query and the selected candidate entity to query construction circuitry 318, which constructs a new query as described above. Query construction circuitry 318 transmits 348 the new query to transceiver circuitry 322, which in turn transmits 350 the new query to content database 212. Transceiver circuitry 322 then receives 352 new search results from content database 212, including content identifiers of a new plurality of content items that match the new search criteria, and transmits 354 the search results to output circuitry 330. Output circuitry 330 then outputs 356 the content identifiers.

Figure 4:
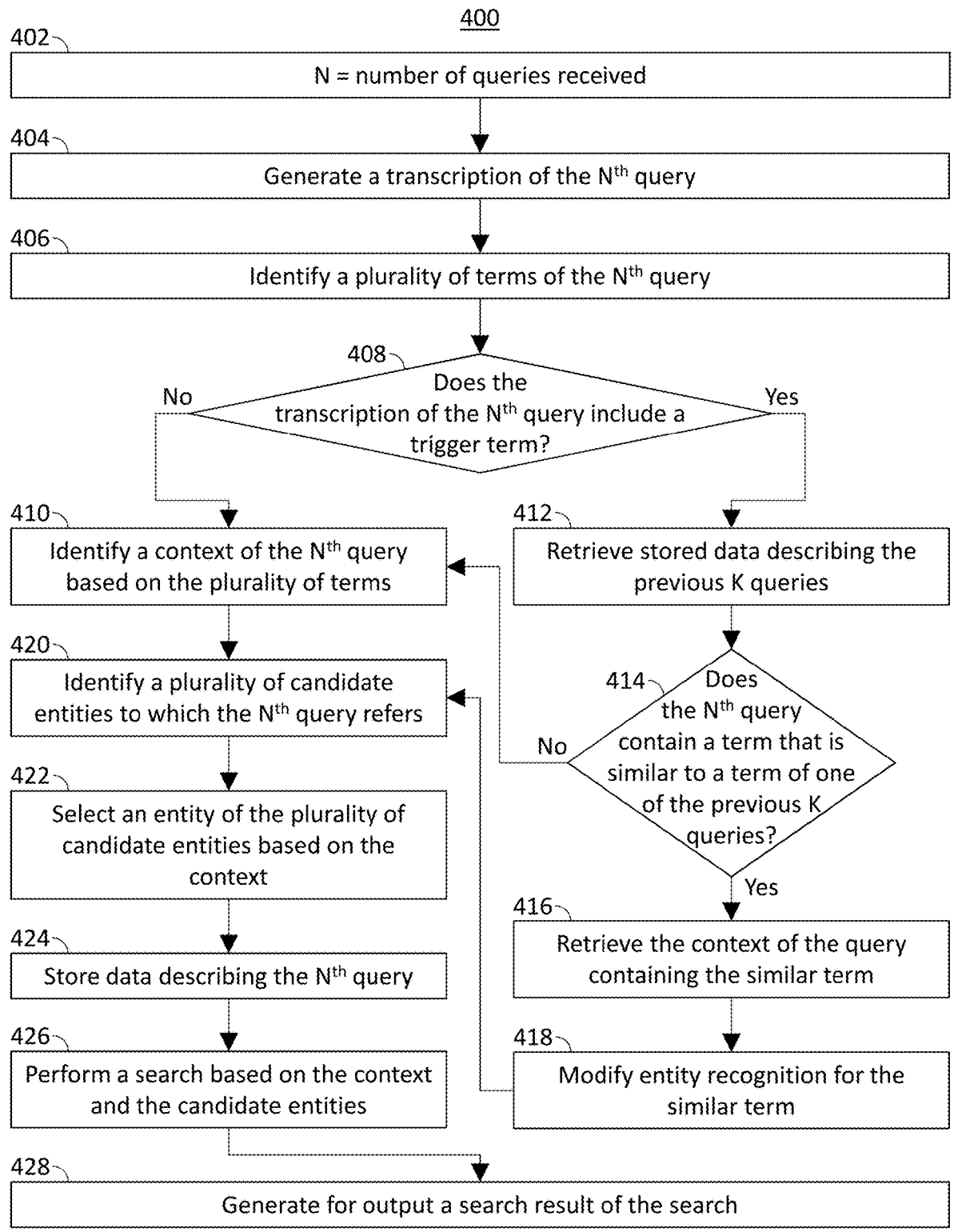
FIG. 4 is a flowchart representing a process for processing first and second voice queries and generating corresponding search results for output, in accordance with some embodiments of the disclosure.

FIG. 4 is a flowchart representing an illustrative process 400 for processing first and second voice queries and generating corresponding search results for output, in accordance with some embodiments of the disclosure. Process 400 may be implemented on control circuitry 306. In addition, one or more actions of process 400 may be incorporated into or combined with one or more actions of any other process or embodiment described herein.

At 402, control circuitry 306 initializes a variable N representing the number of queries that have been received, including a query received at the current time. For example, control circuitry 306 may count the number of queries received within a period of time, such as five minutes. It may be assumed that a query received at the current time is not related to a query received earlier than the period of time prior to the current time. Alternatively, control circuitry 306 may continue to count the number queries received until a threshold amount of time has passed in which no queries have been received. It may be assumed that if a threshold amount of time has passed since the last query was received, then a query received at the current time will not be related to any past queries.

At 404, control circuitry 306, using natural language processing circuitry 308, generates a transcription of the $N^{th}$ query, where the $N^{th}$ query is the query received at the current time. At 406, control circuitry 306, using natural language processing circuitry 308, identifies a plurality of terms of the $N^{th}$ query. For example, natural language processing circuitry 308 may identify a plurality of words in the $N^{th}$ query and determine a part of speech for each word. Natural language processing circuitry 308 may then determine, based on the part of speech of each word, whether each word is part of a phrase including a neighboring word. If so, the neighboring words are identified together as a single term. Otherwise, a single word is identified as a term of the $N^{th}$ query.

At 408, control circuitry 306, using natural language processing circuitry 308, determines whether the transcription of the $N^{th}$ query includes a trigger term, such as a politeness term (e.g., "please"), a negative term (e.g., "no"), a corrective term (e.g., "I meant") or any combination thereof. If the $N^{th}$ query does not include a trigger term ("No" at 408), then, at 410, control circuitry 306, using natural language processing circuitry 308, identifies a context of the $N^{th}$ query based on the plurality of terms. For example, the query may include a "play" command, indicating that the context of the query is a request for media content. Other examples include phrases such as "I want to hear," indicating a request for audio content, and "tell me," indicating a request for information.

If the $N^{th}$ query does contain a trigger term ("Yes" at 408), then, at 412, control circuitry 306 retrieves stored data describing a previous number of queries K. For example, control circuitry 306 may retrieve stored data for the previous five queries, or may retrieve stored data for each query of the K queries prior to the $N^{th}$ query. Then, at 414, control circuitry 306 determines whether the $N^{th}$ query contains a term that is similar to a term of one of the previous K queries. For example, natural language processing circuitry 308 may determine if a term on the $N^{th}$ query is phonetically similar to a term of one of the previous K queries. If the $N^{th}$ query contains a term similar to a term of one of the previous K queries ("Yes" at 414), then, at 416, control circuitry 306 retrieves the context of the query containing the similar term. For example, control circuitry 306 may retrieve a stored context for the particular previous query. Alternatively or additionally, control circuitry 306 may determine if the particular previous query refers to similar subject matter or entities as a group of temporally adjacent queries. If so, a composite context may be generated from the specific contexts of each of these related queries. At 418, control circuitry 306 also modifies an entity recognition model for the similar term. For example, natural language processing circuitry 308 may contain an entity recognition module, which executes an entity recognition model. Control circuitry 306 may temporarily increase a relaxation rate of the entity recognition module, which controls the number of variants of the particular term considered by the entity recognition module in identifying entities that match the particular term. Increasing the relaxation rate allows the entity recognition module to consider more variants of the particular term in order to arrive at the correct entity. If the $N^{th}$ query does not contain a term that is similar to a term of any of the previous K queries ("No" at 414), then processing continues at step 410, and control circuitry 306 determines the context of the $N^{th}$ query as though no trigger term were present.

At 420, control circuitry 306 identifies a plurality of candidate entities to which the $N^{th}$ query refers. In cases where the $N^{th}$ query does not include a trigger term, this occurs after identifying the context of the $N^{th}$ query at step 410. In cases where the $N^{th}$ query does include a trigger term, this may occur upon determining that the $N^{th}$ query does not contain any terms that are similar to any term of any of the previous K queries ("No" at 414), or after modifying the entity recognition at step 418. For example, natural language processing circuitry 308, or an entity recognition module thereof, requests a list of candidates from a database or data structure in which the names of various known entities are stored. A number of entities that match the terms of the $N^{th}$ query, up to a maximum number as governed by the relaxation rate, are then retrieved. At 422, control circuitry 306, using the entity recognition module of natural language processing circuitry 308, selects an entity of the plurality of candidate entities based on the context. Control circuitry 306 then stores data describing the $N^{th}$ query for use in processing later queries.

At 426, control circuitry 306 performs a search based on the context of the $N^{th}$ query and the candidate entity or entities selected by the entity recognition module. In response to the search, control circuitry 306 receives at least one search result which is, at 428, generated for output. For example, the search results can be generated for output visually on a screen or other display device. Alternatively or additionally, the results can be generated for output audibly using a text-to-speech engine.

The actions and descriptions of FIG. 4 may be used with any other embodiment of this disclosure. In addition, the actions and descriptions described in relation to FIG. 4 may be done in suitable alternative orders or in parallel to further the purposes of this disclosure.

Figure 5:
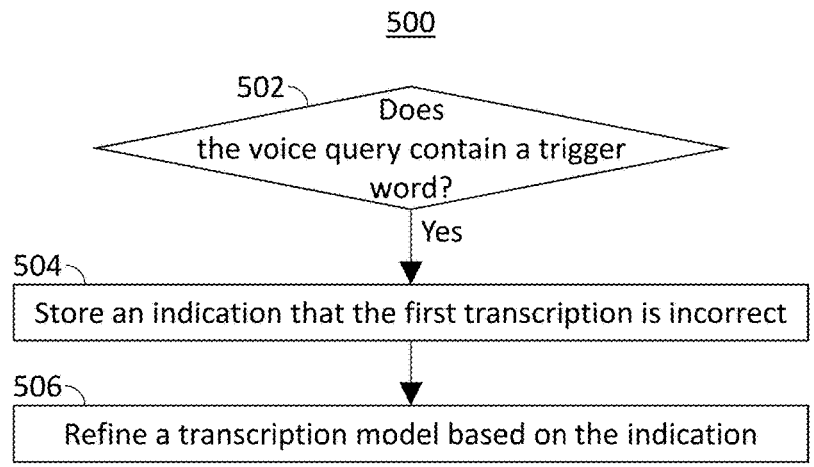
FIG. 5 is a flowchart representing a process for refining a transcription model, in accordance with some embodiments of the disclosure.

FIG. 5 is a flowchart representing an illustrative process 500 for refining a transcription model, in accordance with some embodiments of the disclosure. Process 500 may be implemented on control circuitry 306. In addition, one or more actions of process 500 may be incorporated into or combined with one or more actions of any other process or embodiment described herein.

At 502, control circuitry 306 determines whether the voice query contains a trigger word. If so ("Yes" at 502), then, at 504, control circuitry 306 stores an indication that the first transcription is incorrect. For example, as part of the data describing each query, control circuitry 306 may also include a flag or other indication that the transcription of the voice query is incorrect. At 506, based on the indication that the transcription of the voice query was incorrect, control circuitry 306 refines the transcription model. For example, natural language processing circuitry 308 may employ a transcription model for performing transcription of voice queries into corresponding text. The transcription model may be a default transcription model that is optimized for an average accent in the language for which the transcription model is set. For example, a US English transcription model may be optimized for a Midwestern accent, which has very little stress on each syllable and open vowel qualities. However, a voice query may be received by a user having a heavy Southern accent, or by a non-native English speaker. Control circuitry 306 may identify the accent used by the speaker and refine the transcription model to more accurately process speech in the identified accent.

The actions and descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
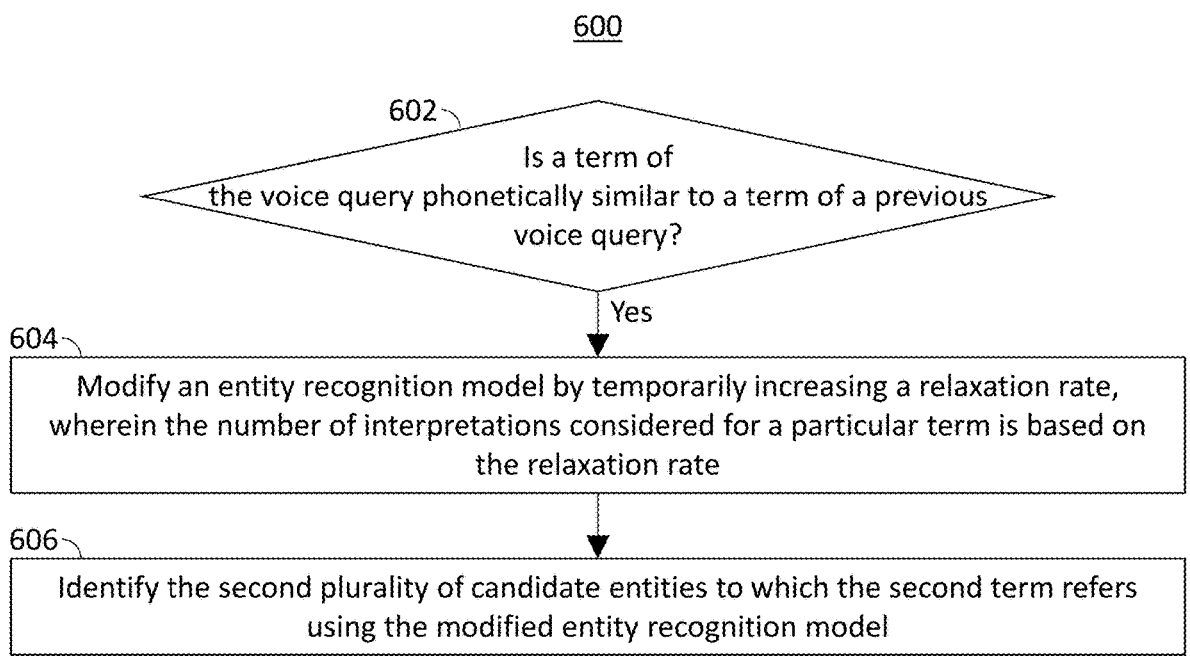
FIG. 6 is a flowchart representing a process for identifying a plurality of candidate entities to which a term of a corrective voice query refers, in accordance with some embodiments of the disclosure.

FIG. 6 is a flowchart representing an illustrative process 600 for identifying a plurality of candidate entities to which a term of a corrective voice query refers, in accordance with some embodiments of the disclosure. Process 600 may be implemented on control circuitry 306. In addition, one or more actions of process 600 may be incorporated into or combined with one or more actions of any other process or embodiment described herein.

At 602, control circuitry 306 determines whether a term of the voice query is phonetically similar to a term of a previous voice query. For example, control circuitry 306 may retrieve audio data of previous voice queries and compare audio corresponding to a particular term with audio corresponding to each term of the voice query. If the audio data is within a threshold difference from the audio data of a term of a previous query, control circuitry 306 determines that the terms are phonetically similar. Alternatively or additionally, control circuitry 306 may compare the transcription of each term to determine, based on spelling, whether the terms should be phonetically similar in pronunciation.

If a term of the voice query is phonetically similar to a term of a previous query ("Yes" at 602), then, at 604, control circuitry 306 modifies an entity recognition model by temporarily increasing a relaxation rate, wherein the number of interpretations considered for a particular term is based on the relaxation rate. At 606, control circuitry 306 identifies the second plurality of candidate entities to which the term of the voice query refers using the modified entity recognition model.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
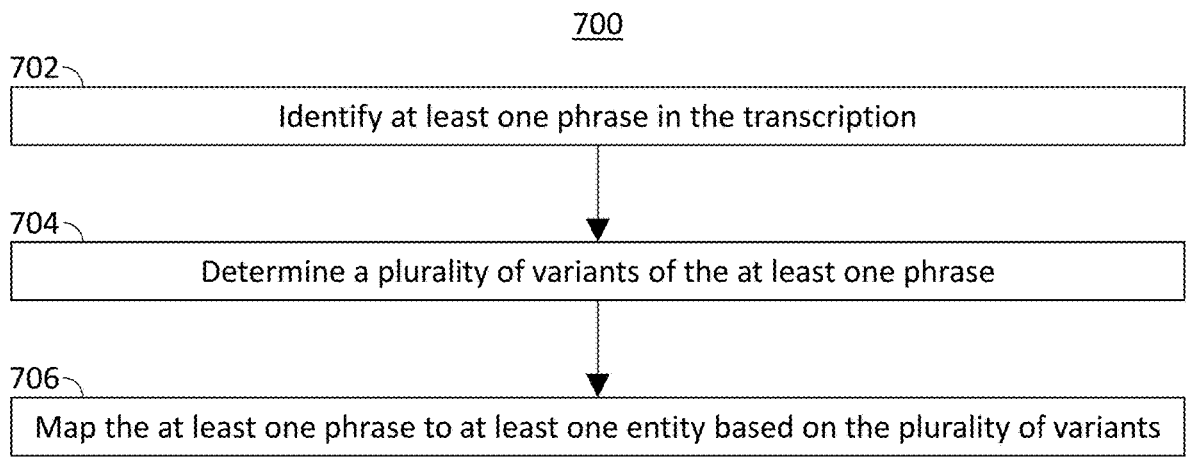
FIG. 7 is a flowchart representing a process for identifying entities to which a term refers, in accordance with some embodiments of the disclosure.

FIG. 7 is a flowchart representing an illustrative process 700 for identifying entities to which a term refers, in accordance with some embodiments of the disclosure. Process 700 may be implemented on control circuitry 306. In addition, one or more actions of process 700 may be incorporated into or combined with one or more actions of any other process or embodiment described herein.

At 702, control circuitry 306 identifies at least one phrase in the transcription. For example, control circuitry 306, using natural language processing circuitry 308, determines whether each word can be combined with an adjacent word to form a larger phrase. At 704, control circuitry 306 determines a plurality of variants of the at least one phrase. For example, control circuitry 306, using natural language processing circuitry 308, compares each phrase with a list of known phrases that are phonetically similar to the identified phrase, or have different orders of the same words of the identified phrase. At 706, control circuitry 306 then maps the at least one phrase to at least one entity based on the plurality of variants. For example, a non-native English speaker may say "Show me the Star Wars" when requesting playback of "Star Wars." The phrase "the Star Wars" is a variant of "Star Wars" that includes the definite article which is not needed in the grammatical context of this query. Control circuitry 306 therefore maps the phrase "the Star Wars" to the movie "Star Wars."

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
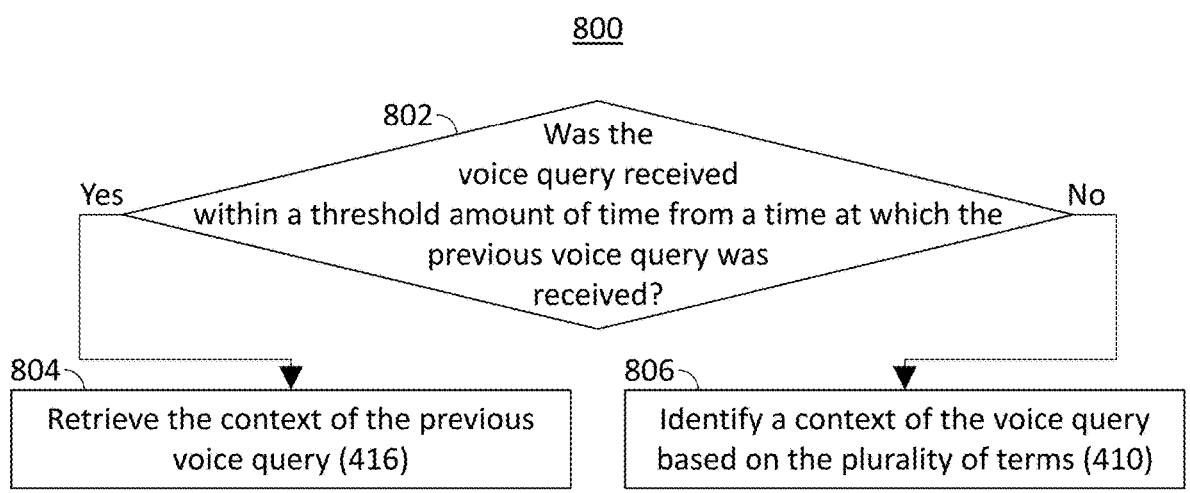
FIG. 8 is a flowchart representing a process for determining the context of a query, in accordance with some embodiments of the disclosure.

FIG. 8 is a flowchart representing an illustrative process 800 for determining the context of a query, in accordance with some embodiments of the disclosure. Process 800 may be implemented on control circuitry 306. In addition, one or more actions of process 800 may be incorporated into or combined with one or more actions of any other process or embodiment described herein.

At 802, control circuitry 306 determines whether the voice query was received within a threshold amount of time from a time at which the previous voice query was received. For example, if the previous voice query was received over five minutes ago, it may not be relevant to a query received at the current time. If the voice query was received within the threshold amount of time ("Yes" at 802), then, at 804, control circuitry 306 retrieves the context of the previous voice query as described above at step 416 of FIG. 4. If the voice query was received after the threshold amount of time has passed ("No" at 802), then, at 806, control circuitry 306 identifies the context of the voice query based on the plurality of terms it contains, as described above at step 410 of FIG. 4.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for improving content discovery in response to a voice query, the method comprising:
   generating a transcription of a voice query;
   determining whether the transcription includes a trigger term indicating that an intent of the voice query is to correct a previous voice query; and
   in response to determining that the transcription includes a trigger term:
      identifying, based on the transcription and data associated with the previous voice query, a first term of the voice query that is similar to a second term of the previous voice query;
      temporarily increasing, for the first term, a relaxation rate of an entity recognition model, wherein a number of interpretations considered for the first term is based on the relaxation rate;
      identifying a plurality of candidate entities to which the first term refers using the entity recognition model and based on the increased relaxation rate;
      performing a search based on the plurality of candidate entities and the data associated with the previous voice query; and
      generating for output a search result of the search.

2. The method of claim 1, further comprising, in response to receiving the previous voice query:
   generating a second transcription of the previous voice query;
   identifying, based on the second transcription, a context of the previous voice query and a second plurality of candidate entities to which the previous voice query refers;
   performing a second search based on the context of the previous voice query and the second plurality of candidate entities; and
   generating for output a second search result of the second search.

3. The method of claim 2, wherein identifying a context of the previous voice query further comprises identifying, based on the transcription, a keyword associated with a type of content.

4. The method of claim 1, wherein the transcription is generated using a voice transcription model.

5. The method of claim 4, further comprising:
   storing an indication that the transcription is incorrect; and
   refining the transcription model based on the indication.

6. The method of claim 1, wherein the trigger term is a politeness term.

7. The method of claim 1, wherein the trigger term is a negative term.

8. The method of claim 1, wherein the previous voice query contains at least a first term and the voice query contains at least a second term in addition to the trigger term, the method further comprising:
   comparing the first term with the second term; and
   determining, based on the comparing, whether the second term is phonetically similar to the first term;
   wherein temporarily increasing, for the second term, the relaxation rate of the entity recognition model occurs in response to determining that the second term is phonetically similar to the first term.

9. The method of claim 1, wherein identifying a plurality of candidate entities further comprises:
   identifying at least one phrase in the transcription;
   determining a plurality of variants of the at least one phrase; and
   mapping the at least one phrase to at least one entity based on the plurality of variants.

10. The method of claim 1, further comprising:
    determining whether the voice query was received within a threshold amount of time from a time at which the previous voice query was received;
    wherein retrieving the context of the previous voice query occurs in response to determining that the voice query was received within the threshold amount of time from the time at which the previous voice query was received.

11. A system for improving content discovery in response to a voice query, the system comprising:
    memory; and
    control circuitry configured to:
       generate a transcription of a voice query;
       determine whether the transcription includes a trigger term indicating that an intent of the voice query is to correct a previous voice query; and
       in response to determining that the transcription includes a rigger trigger term:
          identify, based on the transcription and data, retrieved from the memory, associated with the previous voice query, a first term of the voice query that is similar to a second term of the previous voice query;
          temporarily increase, for the first term, a relaxation rate of an entity recognition model, wherein a number of interpretations considered for the first term is based on the relaxation rate;
          identify a plurality of candidate entities to which the first term refers using the entity recognition model and based on the increased relaxation rate;
          perform a search based on the plurality of candidate entities and the data associated with the previous voice query; and
          generate for output a search result of the search.

12. The system of claim 11, wherein the control circuitry is further configured to, in response to receiving the previous voice query:
    generate a second transcription of the previous voice query;
    identify, based on the second transcription, a context of the previous voice query and a second plurality of candidate entities to which the previous voice query refers;
    perform a second search based on the context of the previous voice query and the second plurality of candidate entities; and
    generate for output a second search result of the second search.

13. The system of claim 12, wherein the control circuitry configured to identify a context of the previous voice query is further configured to identify, based on the first transcription, a keyword associated with a type of content.

14. The system of claim 11, wherein the transcription is generated using a voice transcription model.

15. The system of claim 14, wherein the control circuitry is further configured to:
    store, in the memory, an indication that the first transcription is incorrect; and
    refine the transcription model based on the indication.

16. The system of claim 11, wherein the trigger term is a politeness term.

17. The system of claim 11, wherein the trigger term is a negative term.

18. The system of claim 11, wherein the previous voice query contains at least a first term and the voice query contains at least a second term in addition to the trigger term, and wherein the control circuitry is further configured to:
  compare the first term with the second term; and
  determine, based on the comparing, whether the second term is phonetically similar to the first term;
  wherein the control circuitry configured to temporarily increase, for the second term, the relaxation rate of the entity recognition model is configured to do so in response to determining that the second term is phonetically similar to the first term.

19. The system of claim 11, wherein the control circuitry configured to identify a plurality of candidate entities is further configured to:
  identify at least one phrase in the transcription;
  determine a plurality of variants of the at least one phrase; and
  map the at least one phrase to at least one entity based on the plurality of variants.

20. The system of claim 11, wherein the control circuitry is further configured to:
  determine whether the voice query was received within a threshold amount of time from a time at which the previous voice query was received;
  wherein the control circuitry configured to retrieve the context of the previous voice query is configured to do so in response to determining that the voice query was received within the threshold amount of time from the time at which the previous voice query was received.

* * * * *